United States Patent
Jampani (10) Patent No.: US 9,958,531 B2
(45) Date of Patent: May 1, 2018

(54) DETERMINING A LOCATION OF A WIRELESS DEVICE USING FINGERPRINTING

(71) Applicant: BlackBerry Limited, Waterloo (CA)

(72) Inventor: Krishnam Raju Jampani, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

(21) Appl. No.: 15/165,338

(22) Filed: May 26, 2016

(65) Prior Publication Data

US 2017/0343638 A1    Nov. 30, 2017

(51) Int. Cl.
*G01S 5/02*    (2010.01)

(52) U.S. Cl.
CPC .................. *G01S 5/0252* (2013.01)

(58) Field of Classification Search
CPC ........ G01S 19/06; G01S 5/0027; G01S 11/06; G01S 19/42; G01S 5/0036; G01S 5/021; G01S 5/0252; H04W 64/00; H04W 4/02; H04W 4/023; H04W 64/003; H04W 84/12; H04M 2242/30; H04M 3/42348
See application file for complete search history.

(56) References Cited

U.S. PATENT DOCUMENTS

| | | | | |
|---|---|---|---|---|
| 2003/0064735 A1* | 4/2003 | Spain | .................... | G01S 5/0252 455/456.1 |
| 2008/0285530 A1* | 11/2008 | Dietrich | .................... | G01S 5/02 370/338 |
| 2013/0162481 A1 | 6/2013 | Parvizi et al. | | |
| 2013/0281130 A1* | 10/2013 | Yang | .................... | G01S 19/09 455/456.3 |
| 2014/0171114 A1 | 6/2014 | Marti et al. | | |
| 2014/0179341 A1 | 6/2014 | Sydir | | |
| 2014/0295878 A1 | 10/2014 | Yang | | |
| 2015/0087239 A1 | 3/2015 | Yang | | |
| 2015/0133148 A1 | 5/2015 | Yang | | |
| 2015/0222372 A1 | 8/2015 | Le Grand | | |
| 2016/0018507 A1 | 1/2016 | Chen | | |
| 2016/0033266 A1 | 2/2016 | Le Grand | | |
| 2016/0066151 A1* | 3/2016 | Palanki | .................... | H04L 67/10 455/456.1 |

OTHER PUBLICATIONS

Hossain et al., SSD: A Robust RF Location Fingerprint Addressing Mobile Devices' Heterogeneity, IEEE MASS 2007 (13 pages).

(Continued)

*Primary Examiner* — Thai Vu
(74) *Attorney, Agent, or Firm* — Trop, Pruner & Hu, P.C.

(57) ABSTRACT

In some examples, a query including signal values providing measures of signals between a first wireless device and corresponding access points is received. Access points are ranked for the query based on sorting the signal values. Similarity values are computed, using the ranking, between the query and respective fingerprints of signal values collected at a plurality of locations in an area, each signal value of the signal values in the fingerprints providing a measure of a signal between at least one wireless device at a location of the plurality of locations and a respective access point of the access points. A location of the first wireless device is determined based on the computed similarity values.

19 Claims, 5 Drawing Sheets

(56) References Cited

OTHER PUBLICATIONS

Luo et al., Characterization of Smart Phone Received Signal Strength Indication for WLAN Indoor Positioning Accuracy Improvement, Journal of Networks, vol. 9, No. 3, Mar. 2014 (8 pages).

Jiang et al., Research Article—Indoor Mobile Localization Based on Wi-Fi Fingerprint's Important Access Point, Hindawi Publishing Corporation, International Journal of Distributed Sensor Networks, vol. 2015, Article ID 429104, Mar. 2015 (9 pages).

Lu et al., WiFi Fingerprint Localization in Open Space, 2013 (4 pages).

Li et al., Stanford University, Indoor Positioning System Using Wifi Fingerprint, 2014 (5 pages).

Farshad et al., A Microscopic Look at WiFi Fingerprinting for Indoor Mobile Phone Localization in Diverse Environments, 2013 International Conference on Indoor Positioning and Indoor Navigation, Oct. 2013 (10 pages).

Chan et al., Indoor Localization Using Wi-Fi Based Fingerprinting and Trilateration Techiques for LBS Applications, International Archives of the Photogrammetry, Remote Sensing and Spatial Information Sciences, vol. XXXVIII-4/C26,7th International Conference on 3D Geoinformation, May 2012, Quebec, Canada (5 pages).

Machaj et al., Rank Based Fingerprinting Algorithm for Indoor Positioning, Tampere University of Technology, 2011 (5 pages).

Chen et al., Sensors ISSN 1424-8220 www.mdpi.com/journal/sensors, Article An Improved Algorithm to Generate a Wi-Fi Fingerprint Database for Indoor Positioning, Aug. 2013 (12 pages).

Navarro et al., Wi-Fi Localization Using RSSI Fingerprinting, California Polytechnic State University, 2010 (6 pages).

Wikipedia, Wi-Fi positioning system last modified Jan. 26, 2016 (7 pages).

Canadian Intellectual Property Office, International Search Report and Written Opinion for PCT/CA2017/050628 dated Aug. 30, 2017 (8 pages).

* cited by examiner

DETERMINING A LOCATION OF A WIRELESS DEVICE USING FINGERPRINTING

BACKGROUND

Various techniques can be used to determine the position of a wireless device. In some examples, wireless devices can include Global Positioning System (GPS) receivers that can be used to perform satellite-based positioning of the wireless devices. However, GPS-based positioning techniques may not be effective in an indoor environment or in a dense urban environment, where satellite signals may be attenuated.

BRIEF DESCRIPTION OF THE DRAWINGS

Some implementations are described with respect to the following figures.

DETAILED DESCRIPTION

As used here, a wireless device can refer to an electronic device that is able to communicate wirelessly with another device. Examples of wireless devices include a smartphone, a tablet computer, a notebook computer, a wearable device (e.g. smart watch, smart eyeglasses, etc.), a vehicle, a game appliance, or any other electronic device that is able to communicate wirelessly. In some cases, a wireless device can also be referred to as a mobile device, since it is able to move around to different locations. However, it is noted that in other examples, a wireless device does not have to be mobile during use, but rather can be provided at a fixed location, such as a desktop computer, a server computer, a communication node, and so forth.

Wireless devices can be positioned based on wireless signals transmitted by a wireless network infrastructure, such as a wireless local area network (WLAN) that operates using WI-FI or other wireless protocols. Examples of other wireless technologies include the Bluetooth technology, the Ultra-Wideband (UWB) technology, a cellular technology such as the Long-Term Evolution (LTE) or Evolved Universal Mobile Telecommunications System Terrestrial Radio Access (E-UTRA) technology, and so forth.

A wireless network infrastructure includes an arrangement of wireless access network nodes that are used by wireless devices to communicate with each other or with other endpoint devices. A wireless device can establish a wireless connection with a wireless access network node to allow traffic data of the wireless device to be carried over the wireless connection.

In some examples, a fingerprinting technique can be used for determining a location of a wireless device based on wireless signals transmitted by the wireless network infrastructure. Specific examples of fingerprinting techniques include WI-FI fingerprinting techniques. Although the present disclosure refers to examples in which WI-FI fingerprinting techniques are used, it is noted that in other examples, other fingerprinting techniques based on use of other types of wireless signaling can be employed.

Figure 1:
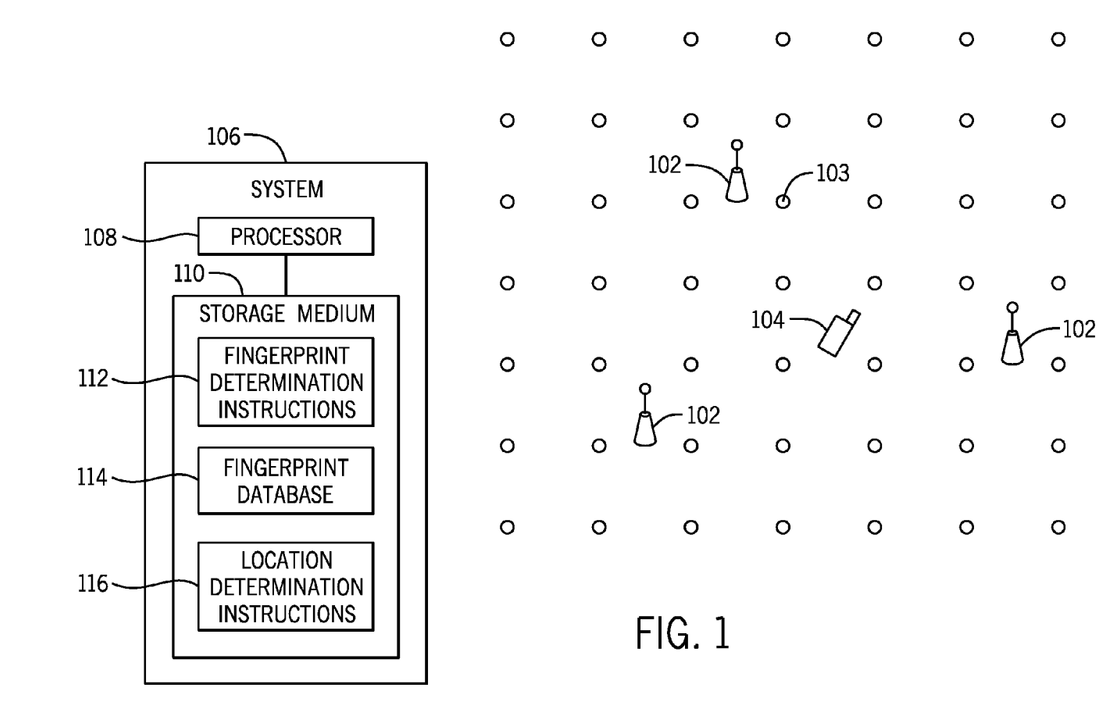
FIG. 1 is a block diagram of an example network arrangement in which a fingerprint-based positioning technique can be implemented, in accordance with some implementations.

FIG. 1 illustrates an example of a network arrangement that includes wireless access points (APs) 102 that are able to communicate wirelessly with a wireless device, such as wireless device 104. Although just one wireless device 104 is shown in FIG. 1, it is noted that there can be multiple wireless devices that are able to communicate with the APs 102 in other examples. Also, although three APs 102 are shown in FIG. 1, it is noted that in other examples, a different number of APs can be deployed.

The APs 102 can be wireless access network nodes that are part of a WLAN that operates according to the WI-FI technology. The WI-FI technology is described by the Institute of Electrical and Electronics Engineers (IEEE) 802.11 standards. In other examples, the APs can refer to other types of wireless access nodes that employ other wireless technologies to communicate with wireless devices.

A fingerprinting technique or mechanism used to position wireless devices can define specific locations (represented by circles in FIG. 1) at which fingerprints are collected. These locations (represented by circles in FIG. 1) can be referred to as "training locations" or "fingerprint locations." In the example of FIG. 1, the fingerprint locations are generally arranged in a rectangular grid within a given area. In other examples, fingerprint locations can have other arrangements.

A fingerprint can refer to a collection (e.g. vector) of signal values detected at a specific fingerprint location, where the signal values are received at the specific fingerprint location by at least one wireless device from the APs 102. At any given fingerprint location, respective signal values from the different APs 102 can be detected. For example, in FIG. 1, assuming that there are three APs, then at least one wireless device at a given fingerprint location can observe a first signal value from a first AP, a second signal value from a second AP, and a third signal value from a third AP. The first, second, and third signal values form a collection of signal values that make up a fingerprint for the given fingerprint location. If there are more APs in the network arrangement, then the collection of signal values collected for each fingerprint location can include more signal values for the additional APs.

The signal values that can be observed can represent strengths of wireless signals between the at least one wireless device and the APs 102. An example of a signal strength value is a Received Signal Strength Indicator (RSSI), which provides a measurement of power present in a received radio signal. In other examples, other indications of signal strength can be employed, such as a value representing a signal-to-noise ratio (SNR), a measurement of signal power, a measurement of signal quality, or any other type of indication from which a signal strength can be derived or inferred. In other examples, the signal values can include information representing a round-trip time (RTT) or another time measure that represents a time of communicating a signal between a wireless device and an AP. The RTT is the total time for a signal to travel from a first device to a second device and back to the first device.

In the ensuing discussion, reference is made to fingerprints that include signal values that represent strengths of signals. In other implementations of the present disclosure, fingerprints can additionally or alternatively include signal values that include time measures, where such time measures that are part of fingerprints can be used to determine a location of a wireless device.

Fingerprints for the different fingerprint locations can be determined during a training phase, when one or more wireless devices can be moved around to the different fingerprint locations to measure signal values from the APs 102. Signal values from the APs are detected by the wireless device(s) during the training phase, and these signal values are provided by the wireless device(s) to a system 106 to develop the fingerprints that are stored in a fingerprint database. The fingerprint database is used by system 106 to perform positioning of a wireless device, or alternatively, the fingerprint database is communicated by the system 106 to other device(s) to perform the positioning of a wireless device.

In examples where multiple wireless devices are used at each fingerprint location during the training phase to measure signal values from the APs, the multiple devices at a particular fingerprint location can each measure its respective collection of signal values from the different APs 102. In such cases, the fingerprint for a given fingerprint location would be the aggregate of signal values acquired by the multiple wireless devices (at the given fingerprint location) for each AP, where the aggregate can be a mean, a median, a minimum, a maximum, a sum, or some other type of aggregate.

As an example, during the training phase, three wireless devices at a fingerprint location 103 can each collect a collection of signal values from the APs 102. For example, wireless device 1 can acquire a first collection of signal values [s1_a, s1_b, s1_c], where s1_a is received by wireless device 1 from a first AP (a), s1_b is received by wireless device 1 from a second AP (b), and s1_c is received by wireless device 1 from a third AP (c). Similarly, wireless device 2 can acquire a second collection of signal values [s2_a, s2_b, s2_c], and wireless device 3 can acquire a first collection of signal values [s3_a, s3_b, s3_c]. The fingerprint [da, db, dc] for the fingerprint location can then be computed by aggregating [s1_a, s1_b, s1_c], [s2_a, s2_b, s2_c], and [s3_a, s3_b, s3_c], where da is an aggregate (e.g. median, mean, mode, etc.) of s1_a, s2_a, and s3_a, db an aggregate of s1_b, s2_b, and s3_b, and dc an aggregate of s1_c, s2_c, and s3_c. A fingerprint at a given location is computed from a set of WI-FI scans collected at or near the given location from one or more wireless devices. The fingerprint is the aggregate signal value of the RSSI (or other signal value) of each observed AP across all the scans collected at or near the given location. The aggregate can be mean or median or mode. For example, if at the given location, AP (a) appears in three scans with respective signal values −64, −67, −69, and AP (b) appears in four scans with respective signal values −45, −50, −50, −53, then the fingerprint at the given location contains value −67 (mean of −64, −67, −69) and value −50 (mean of −45, −50, −50, −53).

In other examples, the determination of a fingerprint at the different fingerprint locations can be determined using just one wireless device.

The signal values acquired by the wireless device(s) at each fingerprint location during the training phase are communicated to the system 106, which can include a computer or an arrangement of computers. The system 106 includes a processor 108 (or multiple processors), and a non-transitory machine-readable or computer-readable storage medium 110 that can store fingerprint determination instructions 112. A processor can include a microprocessor, a microcontroller, a programmable integrated circuit, a programmable gate array, or another hardware processing circuit.

The fingerprint determination instructions are machine-readable instructions that are executable on the processor(s) 108 to determine fingerprints for the different fingerprint locations based on the received signal values acquired by the wireless device(s) during the training phase. The generated fingerprints are stored by the fingerprint determination instructions 112 in a fingerprint database 114. The fingerprint database 114 includes the fingerprints and indications of respective fingerprint locations for the fingerprints.

After the training phase has been performed and the fingerprint database 114 is complete, the fingerprint database 114 can be used for determining the location of a wireless device, such as the wireless device 104 during operation of the wireless device 104. Positioning wireless devices using the fingerprint database 114 can be performed during a "location phase," which is distinct from the training phase.

During use, the wireless device 104 can receive signal values from the respective APs 102. In some implementations, the wireless device 104 can send a location query that includes the received signal values to the system 106 to cause the system 106 to determine the location of the wireless device 104. In the example shown in FIG. 1, location determination instructions 116 are executable on the processor(s) 108 to compare the collection of signal values received from the wireless device 104 to the fingerprint database 114. Based on matching the received collection of signal values in the location query from the wireless device 104 to a fingerprint in the fingerprint database 114, the location determination instructions 116 can estimate the location of the wireless device 104, and the determined location can be communicated back to the wireless device 104 as a response to the location query.

In other examples, instead of performing the location determination in the system 106, it is noted that the location determination can be performed by a different system, such as by an AP 102, or by the wireless device 104 itself. In these alternative implementations, the fingerprint database 114 can be communicated to the APs 102 or the wireless device 104 for use at the APs 102 or the wireless device 104 to perform location determination based on fingerprint matching.

An issue associated with location determination based on fingerprint matching is that the wireless device(s) used during the training phase may have different characteristics from the wireless device (e.g. 104) whose location is to be determined during the location phase. The different characteristics of the wireless devices can be due to hardware differences, such as the difference between hardware of a tablet computer and a smartphone, for example. More generally, different types of wireless devices may have different hardware, which can cause them to detect signal values from the APs 102 differently. The different hardware can be due to differences in orientation and arrangement of radio antennas, the sensitivities of wireless interface circuits, and/or a behavior of signal drivers in the wireless interface circuits. For example, a first type of wireless device can detect a first RSSI from a first AP at a first location, while a second type of wireless device can detect a second, different RSSI from the first AP at the same first location.

In other examples, different characteristics of the wireless devices that can cause the wireless devices at the same location to detect different signal values from the same AP can be due to different software or firmware running on the wireless devices. If a first wireless device has different characteristics from a second wireless device, then the first wireless device can measure different RSSI values than the second wireless device at the exact same location. As a result, comparing raw signal values from two different wireless devices that have different characteristics can result in positioning errors when using a fingerprint technique.

In accordance with some implementations of the present disclosure, techniques or mechanisms are provided to apply computations during the fingerprint matching process that can compensate for different characteristics of wireless devices used during the training phase and the location phase. In some examples, a rank-based signal value difference technique can be employed, where pre-processing based on ranking of signal values received by a wireless device is applied prior to matching the signal values to fingerprints in the fingerprint database 114.

Alternatively, a corresponding difference deviation technique can be used that applies post-processing to differences calculated between received signal values and fingerprints in the fingerprint database 114.

In further implementations, a combination of the rank-based signal difference technique and the corresponding difference deviation technique can be used.

Figure 2A:
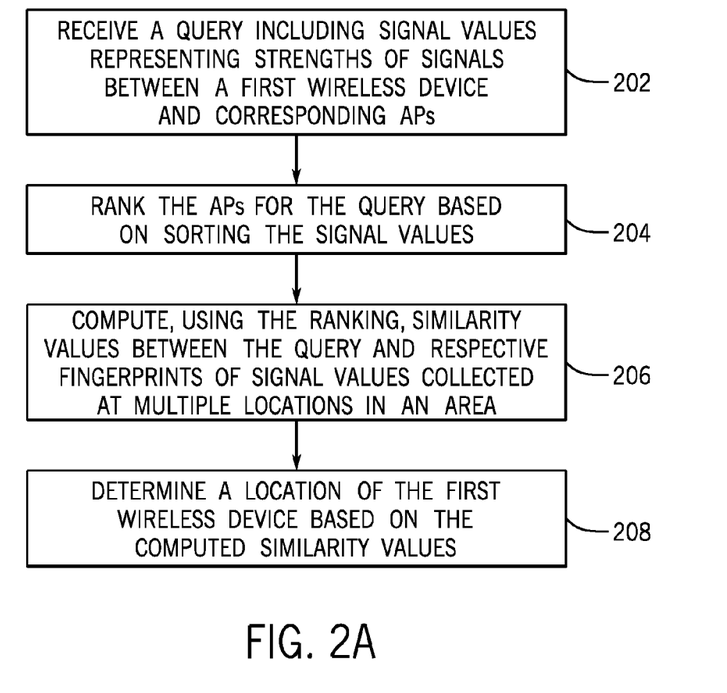
FIGS. 2A-2B are flow diagrams of example positioning techniques, according to some implementations.

FIG. 2A is a flow diagram of an example process according to the rank-based signal value difference technique. The process of FIG. 2A can be performed by the location determination instructions 116 in the system 106. Alternatively, the process of FIG. 2A can be performed by an AP 102 or by the wireless device 104 whose location is to be determined.

The process of FIG. 2A includes receiving (at 202) a query including signal values representing strengths of signals between a first wireless device (e.g. wireless device 104) and corresponding APs 102. In some examples, the signal values can be RSSIs received from the respective APs by the first wireless device. In other examples, the signal values can be computed by the wireless device 104 or by another entity based on signals from the APs detected by the wireless device 104. In yet other examples, the query can include signal values that provide time measures (e.g. RTT) of signals between the first wireless device and the corresponding APs 102. The time measures can be in place of or in addition to representations of strengths of the signals. More generally, a query can include signal values that provide measures (e.g. strength measures and/or time measures) of signals between the first wireless device and the corresponding APs 102.

The process includes ranking (at 204) the APs for the query based on sorting the signal values in the query. The sorting of the signal values arranges the signal values in a sequence of signal values based on which signal values are greater or less than other signal values. For example, the sorting can arrange the signal values in descending order. Arranging signal values in descending order refers to arranging the highest signal value first in sequence and the lowest signal value last in the sequence.

The process of FIG. 2A further includes computing (at 206), using the ranking, similarity values between the query and respective fingerprints of signal values collected at multiple fingerprint locations in an area (such as at the fingerprint locations shown in FIG. 1). Each signal value of the signal values in a fingerprint represents a strength (and/or a time measure) of a wireless signal between at least one wireless device at a fingerprint location and a respective AP. More generally, each signal value in a fingerprint provides a measure of a wireless signal between at least one wireless device at a fingerprint location and a respective AP.

The process of FIG. 2A further determines (at 208) a location of the first wireless device based on the computed similarity values.

A specific example of the rank-based signal value difference technique is described below.

Table 1 below shows an example of signal values collected by the wireless device 104 whose location is to be determined—these signal values collected by the wireless device 104 are in the location query column of Table 1. In addition, Table 1 also includes a fingerprint 1 column and a fingerprint 2 column, which corresponds to fingerprints that are part of the fingerprint database 114. It is assumed that just two fingerprints are in the fingerprint database 114 for purposes of this example.

TABLE 1

| Access Point | Location Query | Fingerprint 1 | Fingerprint 2 |
| --- | --- | --- | --- |
| A1 | −55 | −48 | −63 |
| A2 | −56 | −46 | −65 |
| A3 | −58 | −44 | −67 |
| A4 | −61 | −43 | −74 |
| A5 | −89 | −79 | −60 |
| A6 | −91 | −78 | −80 |

In Table 1, each row represents signal values collected from a respective AP. Thus, the first row includes signal values from AP A1 in the location query, fingerprint 1, and fingerprint 2, respectively; the second row includes signal values from AP A2 in the location query, fingerprint 1, and fingerprint 2, respectively; and so forth.

For each of the location query and the fingerprints, the APs are ranked based on a sorted order (decreasing order) of the signal values. The rank of an AP for the location query or a fingerprint is the position of the AP in the sorted order. In the above example, the sorted order for the location query is {A1, A2, A3, A4, A5, A6}. Thus, for the location query, AP A1 has rank 1, AP A2 has rank 2, and so forth. Similarly, the sorted order for fingerprint 1 is {A4, A3, A2, A1, A6, A5}, and the sorted order for fingerprint 2 is {A5, A1, A2, A3, A4, A6}. Thus the rank of AP A4 is 1 in fingerprint 1, and 5 in fingerprint 2. In further examples, outliers can be omitted or changed in value. For example, in a fingerprint or query, a maximum value for RSSI can be set; any RSSI value higher than the maximum value can be changed to the maximum value. In addition, in a fingerprint or query, the signal values for the top k (k>1) APs are used—the signal values for the remaining APs are ignored.

After the APs have been ranked for each of the location query, fingerprint 1, and fingerprint 2, (1) a first rank-based signal value difference (including a first collection of difference values) is computed between the location query and fingerprint 1, and (2) a second rank-based signal value difference (including a second collection of difference values) is computed between the location query and fingerprint 2.

In some examples, the rank-based signal value difference is represented as a similarity vector of difference values, where each difference value is a measure (expressed as a numeric value or as a different representation) of a difference between a value in a first vector and a corresponding value in a second vector. The first vector includes the signal values of fingerprint k (k=1 or 2 in the above example), and the second vector includes a re-ordered collection of signal values of fingerprint k, where the re-ordering of signal values in the second vector is based on the ranking of APs for the location query. More specifically, given the location query and fingerprint k, the similarity vector between the location query and fingerprint k is computed as follows. The i-th element of the similarity vector is defined as the difference in the signal value (e.g. RSSI) between AP-i and the j-th ranked AP in fingerprint k, where j is the rank of AP-i for the location query. In the example above, the rank-based similarity vector between the location query and fingerprint 1 is:

vector 1−vector 2=[−48,−46,−44,−43,−79,−78]−
[−43,−44,−46,−48,−78,−79]=[−5,−2,2,5,−1,1].

In the above example, vector 1 is fingerprint 1, and vector 2 is a re-ordered collection of the signal values of fingerprint 1 based on the ranking of APs for the location query. For vector 2, the re-ordering of the signal values of fingerprint 1 is based on the ranking of APs for the location query includes arranging the signal values of fingerprint 1 in order from highest ranked AP to lowest ranked AP.

In the above example, note that the signal value of AP A1 in fingerprint 1 is −48, the rank of AP A1 for the location query is 1, and the signal value of the AP with rank 1 in fingerprint 1 is −43. Thus, the first element in vector 2 is −43, and the first element in the rank-based similarity vector is −48−(−43)=−5.

Stated differently, vector 1 for fingerprint 1 is represented as follows:

[RSSI(A1),RSSI(A2),RSSI(A3),RSSI(A4),RSSI(A5),
RSSI(A6)].

Vector 2 for fingerprint 1 is represented as follows:

[RSSI(A4),RSSI(A3),RSSI(A2),RSSI(A1),RSSI(A5),
RSSI(A6)].

The first rank-based signal value difference (e.g. rank-based similarity vector) between fingerprint 1 and the location query is computed as:

[RSSI(A1),RSSI(A2),RSSI(A3),RSSI(A4),RSSI(A5),
RSSI(A6)]−[RSSI(A4),RSSI(A3),RSSI(A2),
RSSI(A1),RSSI(A5),RSSI(A6)].

Similarly, the second rank-based signal value difference (e.g. rank-based similarity vector) between the location query and fingerprint 2 is:

[−63,−65,−67,−74,−60,−80]−[−60,−63,−65,−67,−74,
−80]=[−3,−2,−2,−7,14,0].

Given a rank-based similarity vector, $[d_1, d_2, \ldots, d_n]$ (where n is the number of elements in the similarity vector), between the location query and a respective fingerprint, a similarity measure (e.g. a numeric value or other type of representation) can be calculated in a number of different ways. One example technique for calculating the similarity measure based on the rank-based similarity vector, $[d_1, d_2, \ldots, d_n]$, is a Gaussian similarity technique to produce a Gaussian similarity value, as follows:

$$\prod_{i=1}^{n} e^{-(d_i/h)^2},$$

where h is a smoothing parameter.

Different Gaussian similarity values represent different degrees of similarity between the location query and the respective fingerprints.

Given the similarity values of the query with respect to respective fingerprints, in some examples, the estimated position of the wireless device 104 is defined as the weighted centroid of the fingerprint locations, where the weights are the similarity values. In other examples, other techniques for determining the location of the wireless device 104 using the similarity values can be employed.

In other examples, other similarity measures can be used based on the rank-based similarity vector computed from determining the difference between a fingerprint and a location query. For example, a similarity measure based on a Gaussian kernel can be used.

Figure 2B:
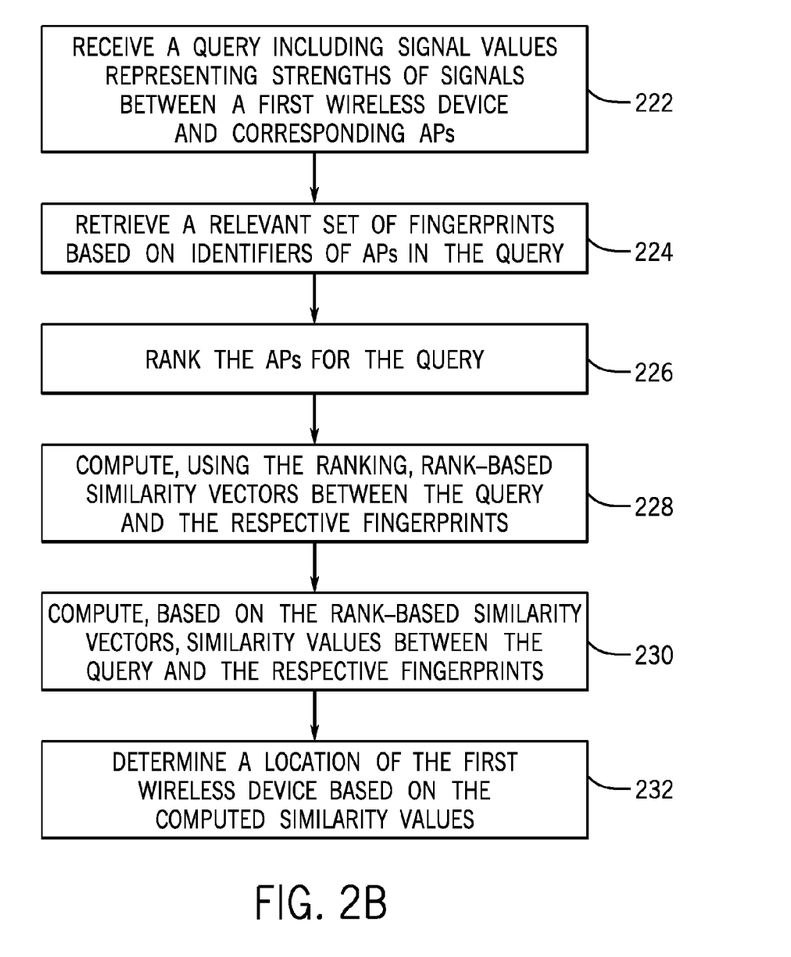

FIG. 2B is a flow diagram of an example process according to further implementations. The process of FIG. 2B can be performed by the location determination instructions 116 in the system 106. Alternatively, the process of FIG. 2B can be performed by an AP 102 or by the wireless device 104 whose location is to be determined.

The process of FIG. 2B includes receiving (at 222) a query including signal values representing strengths (and/or time measures) of signals between a first wireless device (e.g. wireless device 104) and corresponding APs 102. The query can include identifiers of the APs detected by the first wireless device, where the identifiers can be Medium Access Control (MAC) addresses or other types of identifiers.

The process of FIG. 2B includes retrieving (at 224), from a fingerprint database (e.g. 114 in FIG. 1), a relevant set of fingerprints based on the identifiers of the APs in the query. Each fingerprint can also include identifiers of APs for which signal values have been collected in the fingerprint. Thus, the relevant set of fingerprints can be a subset less than all of the fingerprints in the fingerprint database. The fingerprints in the subset are those fingerprints that include identifiers of APs matching the identifiers of APs in the query.

The process of FIG. 2B further includes ranking (at 226) the APs for the query based on sorting the signal values in the query. In addition, the process of FIG. 2B includes computing (at 228), using the ranking of the APs, rank-based similarity vectors between the query and respective fingerprints.

The process of FIG. 2B further includes computing (at 230), based on the rank-based similarity vectors, similarity values between the query and respective fingerprints of signal values collected at multiple fingerprint locations in an area (such as at the fingerprint locations shown in FIG. 1).

The process of FIG. 2B further determines (at 232) a location of the first wireless device based on the computed similarity values.

Figure 3:
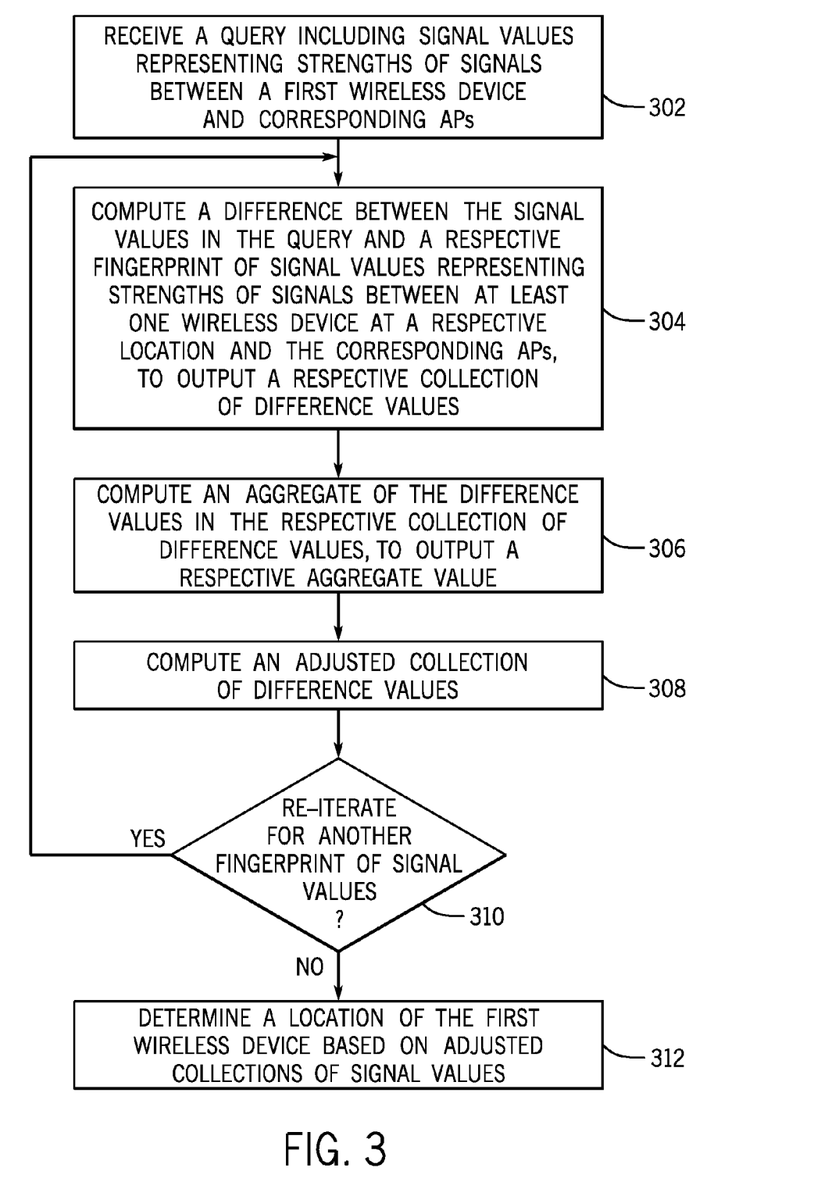
FIG. 3 is a flow diagram of another example positioning technique, according to alternative implementations.

FIG. 3 is a flow diagram of an example process that uses the corresponding difference deviation technique for determining a location of a wireless device. The process of FIG. 3 can be performed by the location determination instructions 116 executable in the system of FIG. 1, in some examples, or the process of FIG. 3 can be performed by an AP 102 or the wireless device 104 whose location is to be derived. The process includes receiving (at 302) a query including signal values representing strengths (and/or time measures) of signals between a first wireless device and corresponding APs. These received signal values can be RSSIs or other indications.

The process includes computing (at 304) a difference between the signal values in the query and a respective fingerprint of signal values (e.g. a fingerprint in the fingerprint database 114 of FIG. 1) representing strengths (and/or time measures) of wireless signals between at least one wireless device at a respective fingerprint location and the corresponding APs, to output a respective collection of difference values. For example, this can be the difference between the signal values of fingerprint 1 and the signal values of the location query.

The process of FIG. 3 includes computing (at 306) an aggregate of the difference values in the respective collection of difference values, to output a respective aggregate value. For example, if the respective collection of difference values is in the form of [d1, d2, d3, d4, d5, d6], then an aggregate of the difference values in the respective collection is based on applying an aggregate function on d1, d2, d3, d4, d5, and d6. In some examples, the applied aggregate can be a median, such that the median value of d1, d2, d3, d4, d5, and d6 is computed. In other examples, the aggregate can be a mean of d1, d2, d3, d4, d5, and d6, a maximum of d1, d2, d3, d4, d5, and d6, a minimum of d1, d2, d3, d4, d5, and d6, a sum of d1, d2, d3, d4, d5, and d6, or some other aggregate.

The process of FIG. 3 then computes (at 308) an adjusted respective collection of difference values based on a difference between the respective collection of first difference values and the respective aggregate value. Thus, if the respective aggregate value is represented as $d_{median}$ (which represents the median of d1-d6), then the adjusted first difference values is computed as follows:

$$[d1-d_{median}, d2-d_{median}, d3-d_{median}, d4-d_{median}, d5-d_{median}, d6-d_{median}] = [d1', d2', d3', d4', d5', d6'].$$

Next, the process of FIG. 3 determines (at 310) if the tasks 304, 306, and 308 are to be re-iterated for another fingerprint of signal values (e.g. another fingerprint in the fingerprint database 114). If so, then tasks 304, 306, and 308 are re-iterated for this other fingerprint of signal values.

If no further collection of signal values is to be processed, then the process of FIG. 3 determines (at 312) a location of the first wireless device based on the respective adjusted collections of signal values produced by multiple iterations of task 308. In some implementations, a similarity measure can be computed based each adjusted collection of difference values [d1', d2', d3', d4', d5', d6'], such as based on a sum of absolute differences as discussed above or some other similarity determination technique.

In alternative implementations, a combination of the rank-based signal difference technique and the corresponding difference deviation technique can be used. In such alternative implementations, prior to task 304, the sorting of the received signal values and the sorting of the collections of signal values can be performed, and then tasks 304, 306, and 308 can be applied on the sorted signal values.

Figure 4:
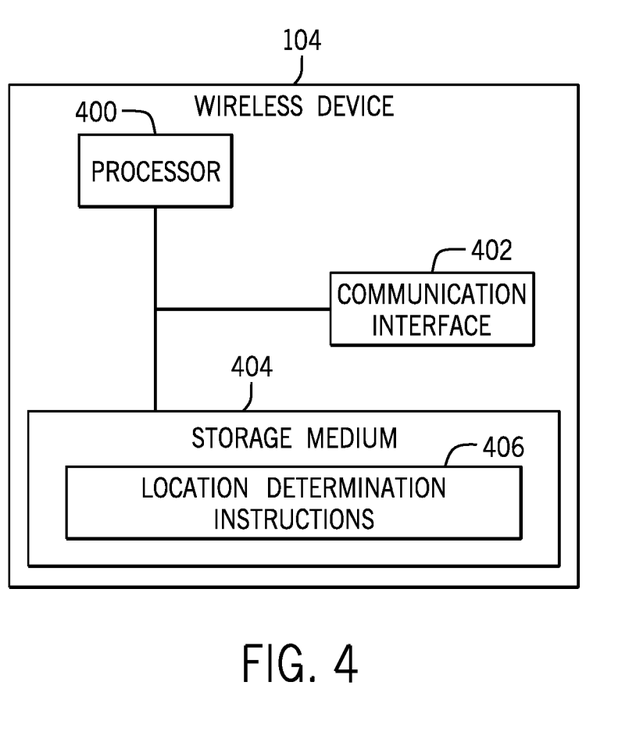
FIG. 4 is a block diagram of a wireless device according to some implementations.

FIG. 4 is a block diagram of an example wireless device 104, which includes a processor (or multiple processors) 400, which can be coupled to a communication interface 402 to communicate wirelessly with an AP 102, and a non-transitory machine-readable or computer-readable storage medium 404 that stores location determination instructions 406 that are executable on the processor(s) 400.

In some examples, the location determination instructions 406 can send a location query (that includes measured signal values such as RSSIs) to a remote system, such as the system 106 or an AP 102, for the system 106 or the AP 102 to compare the signal values of the location query to fingerprints of a fingerprint database (e.g. 114 in FIG. 1) to determine the location of the wireless device 104. The location determination instructions 406 can receive a response to the location query that includes an estimated location of the wireless device 104.

In other examples, the location determination instructions 406 can be executed on the processor(s) 100 to compare the signal values measured by the wireless device 104 to fingerprints of the fingerprint database. In such examples, the fingerprint database 114 is communicated from the system 106 to the wireless device 104 to allow the location determination instructions 406 to perform the comparison.

Each of the storage media 110 (FIG. 1) and 404 (FIG. 4) can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of at least one processor, comprising:
receiving a query including signal values providing measures of signals between a first wireless device and corresponding access points;
ranking the access points for the query based on sorting the signal values;
computing, using the ranking, similarity values between the query and respective fingerprints of signal values collected at a plurality of locations in an area, each signal value of the signal values in the fingerprints providing a measure of a signal between at least one wireless device at a location of the plurality of locations and a respective access point of the access points, wherein the computing of the similarity values comprises computing a first signal value difference between the query and a first fingerprint of the fingerprints of signal values, the first signal value difference based on a difference between the signal values of the first fingerprint and a re-ordered collection of the signal values of the first fingerprint, wherein the signal values in the re-ordered collection is according to the ranking of the access points for the query; and
determining a location of the first wireless device based on the computed similarity values.

2. The method of claim 1, wherein the measures of the signals in the query comprise one or more of measures of strengths of the signals and time measures of the signals.

3. The method of claim 1, wherein the first signal value difference includes a similarity vector of difference values, and wherein an i-th difference value of the similarity vector is computed based on a difference between the signal value of access point i in the first fingerprint and the signal value of a j-th ranked access point in the first fingerprint, where j is a rank of access point i for the query.

4. The method of claim 1, wherein the computing of the similarity values comprises:
   computing a first similarity value based on the first signal value difference; and
   computing further similarity values based on signal value differences between the query and other fingerprints of the fingerprints of signal values,
   wherein the determined location is based on the first similarity value and the further similarity values.

5. The method of claim 1, wherein the re-ordered collection of the signal values of the first fingerprint comprises signal values of the first fingerprint arranged in an order from highest ranked access point to lowest ranked access point.

6. The method of claim 1, wherein the signal values in the query comprise Received Signal Strength Indicators (RSSIs), and the signal values in the fingerprints comprise RSSIs collected during a training phase.

7. The method of claim 1, wherein the signal values in the query comprise round-trip times, and the signal values in the fingerprints comprise round-trip times collected during a training phase.

8. The method of claim 1,
   wherein the first signal value difference is a first rank-based signal value difference, the method further comprising:
   computing an aggregate of difference values in the first rank-based signal value difference to output a first aggregate value; and
   computing adjusted first difference values based on the difference values of the first rank-based signal value difference and the first aggregate value,
   wherein the determining of the location is based on the adjusted first difference values.

9. The method of claim 8, further comprising:
   computing a second rank-based signal value difference between the query and a second fingerprint of the fingerprints;
   computing an aggregate of difference values in the second rank-based signal value difference to output a second aggregate value; and
   computing adjusted second difference values based on the difference values of the second rank-based signal value difference and the second aggregate value,
   wherein determining the location is further based on the adjusted second difference values.

10. A non-transitory storage medium storing instructions that upon execution cause at least one processor to:
    receive a query including signal values providing measures of signals between a first wireless device and corresponding access points;
    compute a first difference between the signal values in the query and a first fingerprint of signal values providing measures of signals between at least one wireless device at a first location and the corresponding access points, to output first difference values, the first difference based on a difference between the signal values of the first fingerprint and a re-ordered collection of the signal values of the first fingerprint, wherein the signal values in the re-ordered collection is according to a ranking of the access points for the query based on sorting of the signal values of the query;
    compute an aggregate of the first difference values to output a first aggregate value;
    compute adjusted first difference values based on computing a difference of the computed first difference values and the first aggregate value; and
    determine a location of the first wireless device based on the adjusted first difference values.

11. The non-transitory storage medium of claim 10, wherein the instructions upon execution cause the at least one processor to:
    compute a second difference between the signal values in the query and a second fingerprint of signal values providing measures of signals between a wireless device at a second location and the corresponding access points, to output second difference values;
    compute an aggregate of the second difference values to output a second aggregate value;
    compute adjusted second difference values based on the computed second difference values and the second aggregate value,
    wherein the location of the first wireless device is determined further based on the adjusted second difference values.

12. The non-transitory storage medium of claim 10, wherein computing the aggregate comprises computing a median of the first difference values or a mean of the first difference values.

13. The non-transitory storage medium of claim 10, wherein the signal values in the query comprise one or more of Received Signal Strength Indicators (RSSIs) and round-trip times, and the signal values in the first fingerprint comprise one or more of RSSIs and round-trip times.

14. The non-transitory storage medium of claim 10, wherein the first fingerprint of signal values is collected during a training phase in which respective fingerprint of signal values are collected at a plurality of locations in an area by the at least one wireless device.

15. A system comprising:
    at least one processor configured to:
    receive a query including signal values providing measures of signals between a first wireless device and corresponding access points;
    rank the access points for the query based on sorting the signal values in the query;
    compute, using the ranking, similarity values between the query and respective fingerprints of signal values collected at a plurality of locations in an area, each signal value of the signal values in the fingerprints providing a measure of a signal between at least one wireless device at a location of the plurality of locations and a respective access point of the access points, wherein computing, using the ranking, of the similarity values between the query and a first fingerprint of the fingerprints comprises using a re-ordered collection of the signal values of the first fingerprint, where the signal values in the re-ordered collection is according to the ranking of the access points for the query; and
    determine a location of the first wireless device based on the similarity values.

16. The system of claim 15, wherein the at least one processor is configured to further:
    compute respective rank-based signal value differences between the query and the respective fingerprints of signal values;
    for each corresponding rank-based signal value difference of the rank-based signal value differences, compute an aggregate of difference values in the corresponding rank-based signal value difference, to output a corresponding aggregate value; and compute adjusted collections of difference values based on the difference values in the respective rank-based signal value differences and the corresponding aggregate values,
wherein determining the location is based on the adjusted collections of difference values.

17. The system of claim 15, wherein the computing of the similarity values comprises computing a first signal value difference between the query and a first fingerprint of the fingerprints of signal values, the first signal value difference based on a difference between the signal values of the first fingerprint and a re-ordered collection of the signal values of the first fingerprint, wherein the signal values in the re-ordered collection is according to the ranking of the access points for the query.

18. The system of claim 17, wherein the first signal value difference includes a similarity vector of difference values, and wherein an i-th difference value of the similarity vector is computed based on a difference between the signal value of access point i in the first fingerprint and the signal value a j-th ranked access point in the first fingerprint, where j is a rank of access point i for the query.

19. The system of claim 15, wherein the access points comprise access points of a wireless local area network.

* * * * *